(12) United States Patent
Chang et al.

(10) Patent No.: US 8,271,493 B2
(45) Date of Patent: Sep. 18, 2012

(54) EXTENSIBLE MECHANISM FOR GROUPING SEARCH RESULTS

(75) Inventors: Thomas H. Chang, Redwood Shores, CA (US); Meeten Bhavsar, Emerald Hills, CA (US); Muralidhar Krishnaprasad, Redmond, WA (US)

(73) Assignee: Oracle International Corporation, Redwood Shores, CA (US)

( * ) Notice: Subject to any disclaimer, the term of this patent is extended or adjusted under 35 U.S.C. 154(b) by 407 days.

(21) Appl. No.: 11/974,085

(22) Filed: Oct. 11, 2007

(65) Prior Publication Data

US 2009/0100039 A1    Apr. 16, 2009

(51) Int. Cl.
    *G06F 17/30*    (2006.01)
(52) U.S. Cl. .................... 707/737; 707/722; 707/728
(58) Field of Classification Search .................. 707/705, 707/706, 708, 709, 758, 728, 722, 736, 737
    See application file for complete search history.

(56) References Cited

U.S. PATENT DOCUMENTS

| | | | |
|---|---|---|---|
| 4,597,044 A | 6/1986 | Circello | |
| 6,278,992 B1 | 8/2001 | Curtis et al. | |
| 6,547,829 B1 | 4/2003 | Meyerzon et al. | |
| 6,615,209 B1 | 9/2003 | Gomes et al. | |
| 6,658,423 B1 * | 12/2003 | Pugh et al. | 1/1 |
| 6,665,837 B1 | 12/2003 | Dean et al. | |
| 6,785,688 B2 * | 8/2004 | Abajian et al. | 707/700 |
| 6,842,761 B2 * | 1/2005 | Diamond et al. | 1/1 |
| 6,847,977 B2 * | 1/2005 | Abajian | 709/223 |
| 6,877,002 B2 * | 4/2005 | Prince | 707/749 |
| 6,941,300 B2 * | 9/2005 | Jensen-Grey | 707/710 |
| 6,947,930 B2 * | 9/2005 | Anick et al. | 707/5 |
| 7,137,065 B1 * | 11/2006 | Huang et al. | 715/205 |
| 7,139,756 B2 | 11/2006 | Cooper et al. | |
| 7,366,718 B1 * | 4/2008 | Pugh et al. | 1/1 |
| 7,398,261 B2 * | 7/2008 | Spivack et al. | 706/55 |
| 7,401,064 B1 * | 7/2008 | Arone et al. | 1/1 |
| 7,457,279 B1 | 11/2008 | Scott et al. | |
| 7,519,589 B2 * | 4/2009 | Charnock et al. | 1/1 |
| 7,584,208 B2 * | 9/2009 | Spivack et al. | 1/1 |
| 7,640,267 B2 * | 12/2009 | Spivack et al. | 1/1 |
| 7,720,836 B2 * | 5/2010 | Abajian et al. | 707/711 |
| 7,752,186 B2 * | 7/2010 | Abajian | 707/705 |
| 7,797,635 B1 * | 9/2010 | Denise | 715/738 |
| 8,135,711 B2 * | 3/2012 | Charnock et al. | 707/728 |
| 2002/0103737 A1 | 8/2002 | Briere | |
| 2003/0172066 A1 | 9/2003 | Cooper et al. | |
| 2003/0204430 A1 | 10/2003 | Kalmick et al. | |
| 2004/0186827 A1 * | 9/2004 | Anick et al. | 707/3 |
| 2005/0144158 A1 * | 6/2005 | Capper et al. | 707/3 |
| 2006/0010126 A1 * | 1/2006 | Anick et al. | 707/4 |

(Continued)

OTHER PUBLICATIONS

U.S. Office Action in co-pending U.S. Appl. No. 11/714,418, and entitled "Extensible Mechanism for Detecting Duplicate Search Items" having a date of mailing of Jun. 2, 2009.

(Continued)

*Primary Examiner* — Jean M Corrielus
(74) *Attorney, Agent, or Firm* — Kraguljac Law Group LLC (57) ABSTRACT

Systems, methods, and other embodiments associated with grouping automated search results are described. One embodiment includes a computer-readable medium storing computer-executable instructions operable to perform a method that includes identifying items to group. The method also includes selectively grouping a first item and a second item upon determining that a comparison of a metadata attributes indicates that the first item and the second item are to be treated as members of a group.

22 Claims, 5 Drawing Sheets

U.S. PATENT DOCUMENTS

| | | |
|---|---|---|
| 2006/0036696 A1 | 2/2006 | Maresh |
| 2006/0041597 A1 | 2/2006 | Conrad et al. |
| 2006/0248066 A1 | 11/2006 | Brewer |
| 2006/0271526 A1* | 11/2006 | Charnock et al. ............ 707/3 |
| 2007/0033191 A1* | 2/2007 | Hornkvist et al. ............ 707/9 |
| 2007/0067305 A1* | 3/2007 | Ives ............ 707/10 |
| 2007/0234398 A1 | 10/2007 | Muehlbauer |
| 2008/0033919 A1* | 2/2008 | Arrouye et al. ............ 707/3 |

OTHER PUBLICATIONS

Notice of Allowance and Fees Due in co-pending U.S. Appl. No. 11/714,418, and entitled "Extensible Mechanism for Detecting Duplicate Search Items" having a date of mailing of Oct. 20, 2009.

* cited by examiner

EXTENSIBLE MECHANISM FOR GROUPING SEARCH RESULTS

CROSS-REFERENCE TO RELATED APPLICATION(S)

This application is related to U.S. patent application Ser. No. 11/714,418, filed on Mar. 6, 2007, titled "Extensible Mechanism for Detecting Duplicate Search Items", inventors Krishnaprasad et al., and assigned to the present assignee.

BACKGROUND

Conventional search systems may include logic to detect and group related documents returned in response to a query. This logic tends to be fixed and pre-defined. This logic also tends to rely solely on text-based comparisons (e.g., string, proximity). Thus, these conventional systems may compare document content, the URL of documents, and/or subject lines of emails to determine whether documents are to be treated as part of a group.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

A search engine may receive a query from a user, search a search space for items (e.g., documents) relevant to the query, and return relevant items to the user. A search may return a large number of documents. To make an intelligent presentation of these documents to the user, example systems and methods described herein may group the search results. Rather than use a conventional fixed approach, example systems and methods may employ an extensible mechanism for grouping search results.

The following includes definitions of selected terms employed herein. The definitions include various examples and/or forms of components that fall within the scope of a term and that may be used for implementation. The examples are not intended to be limiting. Both singular and plural forms of terms may be within the definitions.

"Computer-readable medium", as used herein, refers to a medium that participates in directly or indirectly providing signals, instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium include, but are not limited to, a floppy disk, a flexible disk, a hard disk, a magnetic tape, other magnetic medium, a CD (compact disk), other optical medium, a RAM (random access memory), a ROM (read only memory), a memory chip or card, a memory stick, and other media from which a computer, a processor or other electronic device can read.

"Crawler", as used herein, refers to an automated process that browses through a crawl frontier in a systematic, automated manner. A crawler may browse through a set of reachable locations and update an index concerning the locations, gather information from the locations, perform maintenance, and so on. The crawlers described herein may be used to search for information relevant to a search request. Thus, a search engine may provide a crawler with a string(s) and/or a gram(s) to search for, and then the crawler may systematically, automatically traverse its crawl frontier looking for these string(s) and/or gram(s).

"Data store", as used herein, refers to a physical and/or logical entity that can store data. A data store may be, for example, a database, a table, a file, a list, a queue, a heap, a memory, a register, and so on. In different examples, a data store may reside in one logical and/or physical entity and/or may be distributed between two or more logical and/or physical entities.

"Logic", as used herein, includes but is not limited to hardware, firmware, software in execution, and/or combinations of each to perform a function(s) or an action(s), and/or to cause a function or action from another logic, method, and/or system. Logic may include a software controlled microprocessor, a discrete logic (e.g., application specific integrated circuit (ASIC)), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

"Metadata", as used herein, refers to data that describes other data. Metadata may describe the source of a particular data, the date the data was created, information about how the data is formatted, and so on. Metadata may be encoded and/or embedded in the data.

"Object" is used herein in its computer science term of art form (e.g., object-oriented). Thus, "object" refers to an entity that includes both data and methods for manipulating the data. Portions of the data may be public while portions may be private. Similarly, some object methods may be public while some object methods may be private.

An "operable connection", or a connection by which entities are "operably connected", is one in which signals, physical communications, and/or logical communications may be sent and/or received. Typically, an operable connection includes a physical interface, an electrical interface, and/or a data interface. Note that an operable connection may include differing combinations of these or other types of connections sufficient to allow operable control. For example, two entities can be operably connected by being able to communicate signals to each other directly or through one or more intermediate entities including a processor, an operating system, a logic, software, or other entity. Logical and/or physical communication channels can be used to create an operable connection.

"Query", as used herein, refers to a semantic construction that facilitates gathering and processing information. A query may be formulated in a database query language (e.g., structured query language (SQL)), an object query language (OQL), a natural language, and so on.

"Signal", as used herein, includes but is not limited to one or more electrical or optical signals, analog or digital signals, data, one or more computer or processor instructions, messages, a bit or bit stream, or other means that can be received, transmitted and/or detected.

"Software", as used herein, includes but is not limited to, one or more computer or processor instructions that can be read, interpreted, compiled, and/or executed and that cause a computer, processor, or other electronic device to perform functions, actions and/or behave in a desired manner. "Software" does not refer to stored instructions being claimed as stored instructions per se. The instructions may be embodied in various forms including routines, algorithms, modules, methods, threads, and/or programs including separate applications or code from dynamically linked libraries. Software may be implemented in a variety of executable and/or loadable forms including, but not limited to, a stand-alone program, a function (local and/or remote), a servelet, an applet, instructions stored in a memory, part of an operating system, or other types of executable instructions.

"User", as used herein, includes but is not limited to one or more persons, software, computers or other devices, or combinations of these.

Some portions of the detailed descriptions that follow are presented in terms of algorithms and symbolic representations of operations on data bits within a memory. These algorithmic descriptions and representations are the means used by those skilled in the art to convey the substance of their work to others. An algorithm, here and generally, is conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic, and so on. The physical manipulations create a concrete, tangible, useful, real-world result.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms including processing, computing, determining, and so on, refer to actions and processes of a computer system, logic, processor, or similar electronic device that manipulates and transforms data represented as physical (electronic) quantities.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 1:
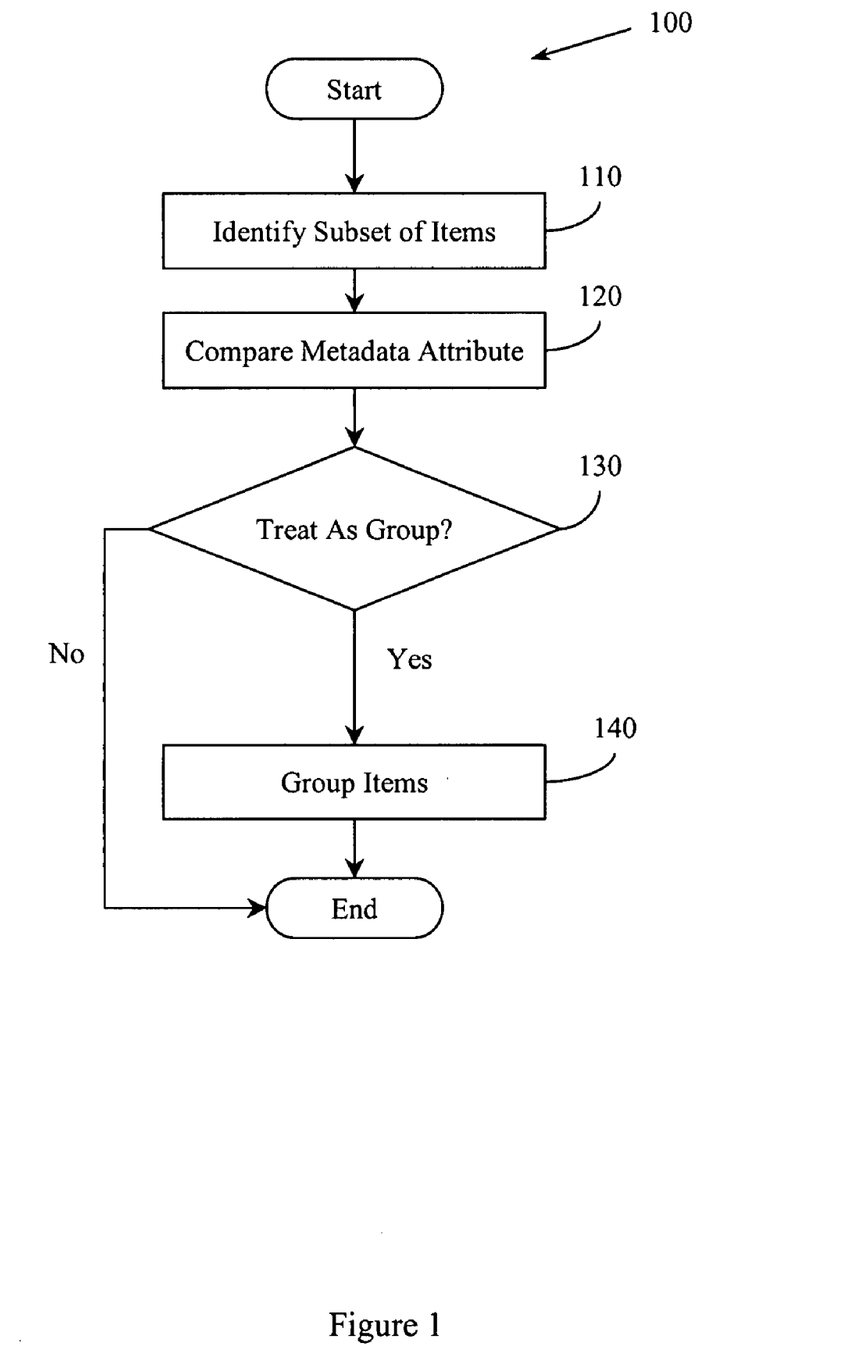
FIG. 1 illustrates an example method associated with grouping search items.

FIG. 1 illustrates a method 100 for grouping search results returned from an automated search engine. A set of computer-executable instructions that may cause a computer to perform method 100 may be stored on a computer readable medium. Method 100 may include, at 110, identifying a subset of items. The subset of items may be identified from a set of items provided by a search process and/or logic. The search process may provide the set of items in response to a search request. The search process may identify the set of items as being relevant to the search request.

In one example, identifying 110 the subset of items includes selecting members of the set of items that have related metadata attributes. Related metadata attributes are those that are capable of being compared to each other to determine whether the items associated with the metadata attributes are to be treated as members of a group. For example, a metadata attribute may identify the source of an item. Thus, a subset of items may include items having a metadata attribute identifying the source of the item. While a source is described, it is to be appreciated that other metadata attributes may be processed.

In another example, items returned by the search process may be deemed to have metadata attributes that can be compared. In this example, no identification of "related" metadata attributes is required before comparing metadata attributes. Therefore the subset identified may be the entire set of items provided by the search process, may be a pair of items with similar relevance scores, may be a random pair of items, may be N consecutive items (N being an integer), may be N randomly selected items, and so on.

Method 100 may also include, at 120, comparing metadata attributes of items in the subset. Note that metadata attributes associated with items are compared rather than the items themselves. Conventionally, a bit-wise, byte-wise, gram-wise, and/or string-wise comparison of the actual items may have been made. This comparison might have been performed using items that had already been retrieved from remote locations. By examining metadata attributes associated with items that have yet to be retrieved, significant retrieval processing may be avoided. In one example, however, the metadata attributes associated with the items as well as the items may be retrieved. In this example, selected retrieved items are discarded after metadata attribute comparison. While a single metadata attribute is described, in one example an item returned by the search process may include multiple metadata attributes. Thus, comparing metadata attributes of items in the subset may include comparing multiple metadata attributes.

Method 100 may also include, at 130, determining whether the comparison of the related metadata attributes indicates that the items associated with the metadata attributes are to be treated as members of a group. If the items are to be treated as a group, then method 100 may proceed, at 140, to selectively group the items, otherwise processing may conclude. Grouping the items may include altering the location of an item, changing a pointer to an item, and so on.

Consider a subset of items including calendar entries, spreadsheets, emails, and text documents. These items may be associated with a particular search word or phrase and therefore may have been identified by a search process as being relevant to a search request. Conventional search systems may display the subset of items in a single list. This may be an inefficient use of limited screen space. By comparing metadata attributes of the items of the subset, the items may be grouped according to the application source. For example, calendar entry items of the subset may be displayed together, followed by spreadsheet items, email items, and finally text document items. Thus, limited screen space may be used efficiently.

In one example, method 100 may also include providing the search request to the search process. The search request may be formatted to indicate that the search process is to provide metadata attributes useful for grouping analysis. In one example, the search request may indicate the size and format of the metadata attribute(s) for the search process to provide. Having provided the search request, in one example method 100 may also include receiving the set of items from the search process.

Emails, calendar entries, text documents, and spreadsheets are mentioned above. It is to be appreciated that the set of items returned by the search process may include different types of things. For example, the set of items may include a document, a file, a record, an object, and so on. The document may be, for example, a word processing document, a spreadsheet document, and so on. The file may be, for example, a Hypertext Markup Language (HTML) file, an Extensible Markup Language (XML) file, and so on. The record may be, for example, a purchase order, a client relationship management record, a sales receipt, a message, and so on. The object may be, for example, a productivity object (e.g., word processing object, spread sheet object), a business object (e.g., back office application object, front office application object), and so on. While various documents, files, and objects are described, it is to be appreciated that method 100 may process items for which an identity field is available.

The search process may be performed, for example, by an enterprise search engine, by a set of crawlers, and so on. While an enterprise search engine and a crawler are described, it is to be appreciated that items that are both relevant to a query and formatted with a metadata attribute may be returned by different search processes. A metadata attribute may be identified in different ways. For example, a crawler may include logic and intelligence to identify a static metadata attribute for a crawled item. Similarly, an object manager (e.g., email server) may create and assign a metadata attribute to an item. An application, (e.g., word processor) may also create and assign a metadata attribute to an item. For example, an email item may have one type of static metadata attribute, a calendar entry item may have another type of static metadata attribute, and a document item, a file item, a record item, an object item, and other items may have other types of static metadata attributes. In one example, a metadata attribute may be identified dynamically, after an item has been processed (e.g., crawled, indexed).

Figure 2:
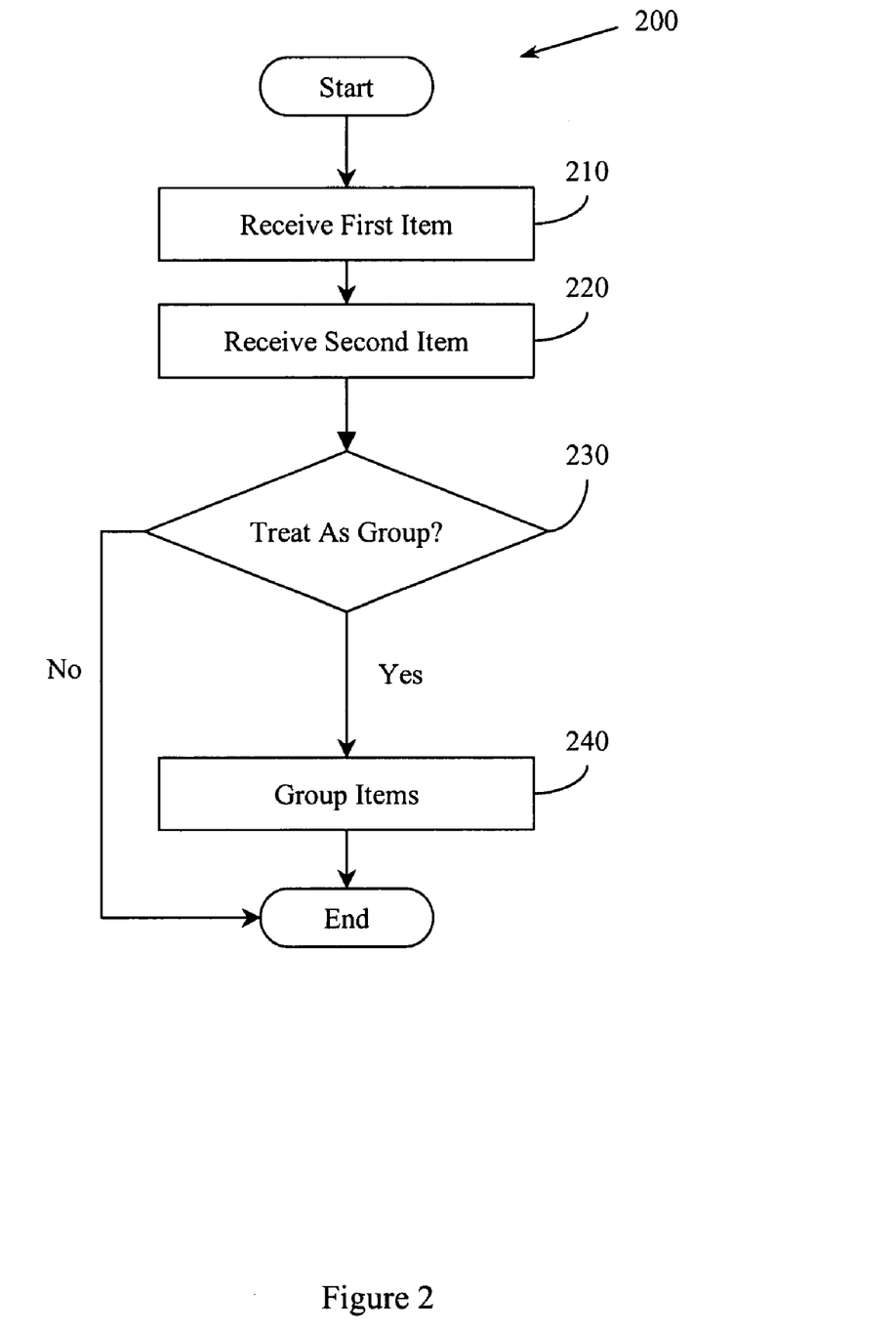
FIG. 2 illustrates another example method associated with grouping search items.
Figure 3:
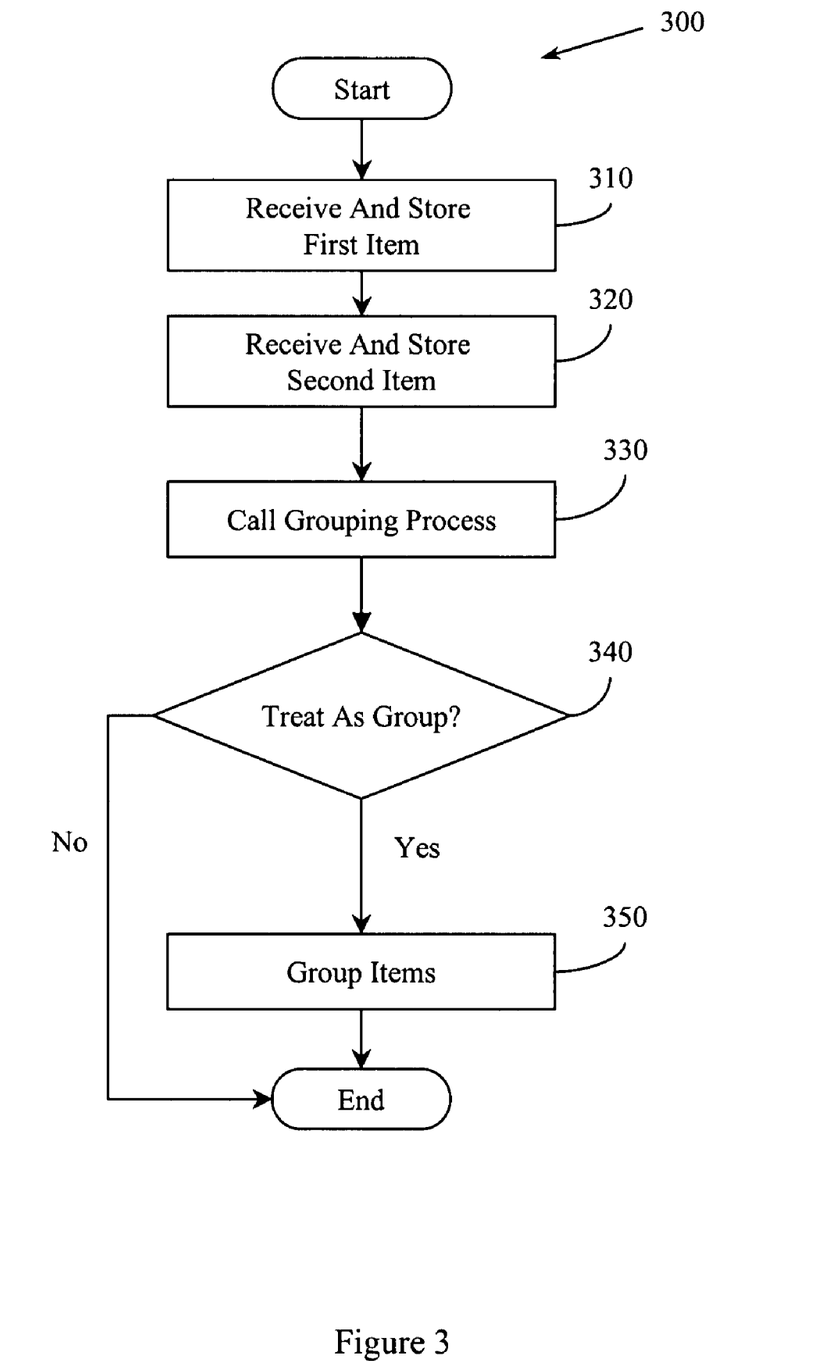
FIG. 3 illustrates another example method associated with grouping search items.

Method 100 may include aggregating the items in the subset. For example, after items in a subset are grouped, method 100 may provide a total of the number of items within each group. In different examples, method 100 may be performed after a portion of a search has provided partial results and/or after a complete search have provided a complete set of items. FIG. 2, described below, illustrates a method 200 that may be performed "on the fly" as search results are provided. FIG. 3, also described below, illustrates a method 300 where a separate process is invoked to determine whether items are to be treated as members of a group.

While FIG. 1 illustrates various actions occurring in serial, it is to be appreciated that various actions illustrated in FIG. 1 could occur substantially in parallel. By way of illustration, a first process could identify subsets of items, a second process could compare metadata attributes and determine whether items are to be treated as members of a group, and a third process could selectively group items. While three processes are described, it is to be appreciated that a greater and/or lesser number of processes could be employed and that lightweight processes, regular processes, threads, and other approaches could be employed.

While method 100 is described being stored on a computer-readable medium, it is to be appreciated that other example methods described herein may also be implemented as processor executable instructions and/or operations stored on a computer-readable medium. Thus, in different examples, a computer-readable medium may store processor executable instructions operable to perform other methods described and claimed herein.

FIG. 2 illustrates a method 200 that may be performed on the fly as results are provided by a search process. Method 200 may include, at 210, receiving a first item in response to a search. The first item may include a metadata attribute that can be compared to metadata attributes of other items to determine whether the items are to be treated as members of a group.

Thus, method 200 may also include, at 220, receiving a second item in response to the search. This second item may also include a metadata attribute. Having two items with metadata attributes, method 200 may continue, at 230, by comparing the metadata attribute of the second item with the metadata attribute of the first item to determine whether the first item and the second item are to be treated as members of a group. If the determination is Yes, then method 200 may proceed, at 240, to group the second item with the first item.

Once again the items received may include documents, files, objects, emails, calendar entries, and so on, that may be retrieved by an enterprise search engine. In one example, the enterprise search engine may use crawlers to perform a portion(s) of the search. Thus, the enterprise search engine may control a crawler(s) to return certain results. The results returned may, in different examples, be limited to results that include a metadata attribute, be limited to results that include a certain type of metadata attributes, be limited to results that include a certain sized metadata attribute, and so on. In one example, a crawler may include logic and intelligence to identify a static metadata attribute for a crawled item. Similarly, an object manager (e.g., email server) may create and assign a metadata attribute to an item. An application, (e.g., word processor) may also create and assign a metadata attribute to an item. In one example, a metadata attribute may be identified dynamically, after an item has been processed (e.g., crawled, indexed).

FIG. 3 illustrates a method 300 that may be performed on the fly as results are retrieved and/or on a set of stored items. Method 300 may include, at 310, storing a first item received in response to a search. The first item may include a grouping callback identifier. The grouping callback identifier can be used to invoke a process that will determine whether items are to be treated as members of a group. This facilitates making search result grouping extensible and isolating the grouping process from the receiver. Applications, object managers, crawlers, item sources, and so on, that may provide results that are relevant to a search may define their own process that will identify whether items are to be treated as members of a group. This process may be available through the callback identifier.

Consider a set of items including emails. In method 100 (FIG. 1), a metadata attribute was provided that could be examined by the receiver of emails returned as relevant search results. This places the grouping intelligence in the receiver, making the receiver responsible for doing metadata attribute comparisons. In method 300, a callback identifier (e.g., process address, object method address, remote procedure call address) is provided. This callback identifier identifies a process that is available to compare the emails. This removes the comparison intelligence from the receiver and puts it elsewhere, leaving the receiver responsible only for deciding whether to call the remote process. Thus, when matching callback identifiers (e.g., matching remote procedure call addresses) are identified, a determination of whether items are to be treated as members of a group can be made by the provider of the item with which the callback identifier is associated (e.g., provider of the email). While an email is described, it is to be appreciated that the set of items may also include a document, a file, an object, a calendar entry, and so on. Additionally, other item providers (e.g., calendars, thread managers, object managers, discussion forums) may also provide callable processes for determining whether the items they provide are to be treated as members of a group.

Method 300 may also include, at 320, storing a second item received in response to the search. The second item may also include a grouping callback identifier. In one example, when the grouping callback identifiers associated with the first and second item match, then the executable associated with the callback may be invoked. Items processed may be limited to items associated with a single pre-defined callback identifier. In another example, callback identifiers do not have to be matched before the callback can occur.

Method 300 may also include, at 330, calling the process associated with the callback identifier and, at 340, determining whether the two items are to be treated as members of a group based on the result of the called process. If the determination is Yes, method 300 may proceed, at 350, by selectively grouping the first item with the second item upon determining that a process available through the grouping callback identifier indicates that the first item and the second item are to be treated as members of a group. While comparing two items is described, it is to be appreciated that a process may receive more than two inputs and group the larger set. For example, the callback process may be provided with a list of items to be grouped, a pointer to a set of items to be grouped, and so on.

The process available through the grouping callback identifier may be, for example, a user-definable process. This facilitates item providers changing their definition of "a group" over time without requiring the receiver to change its logic. In different examples the process that determines whether items are to be treated as members of a group may be a local process, a remote process, and so on.

Figure 4:
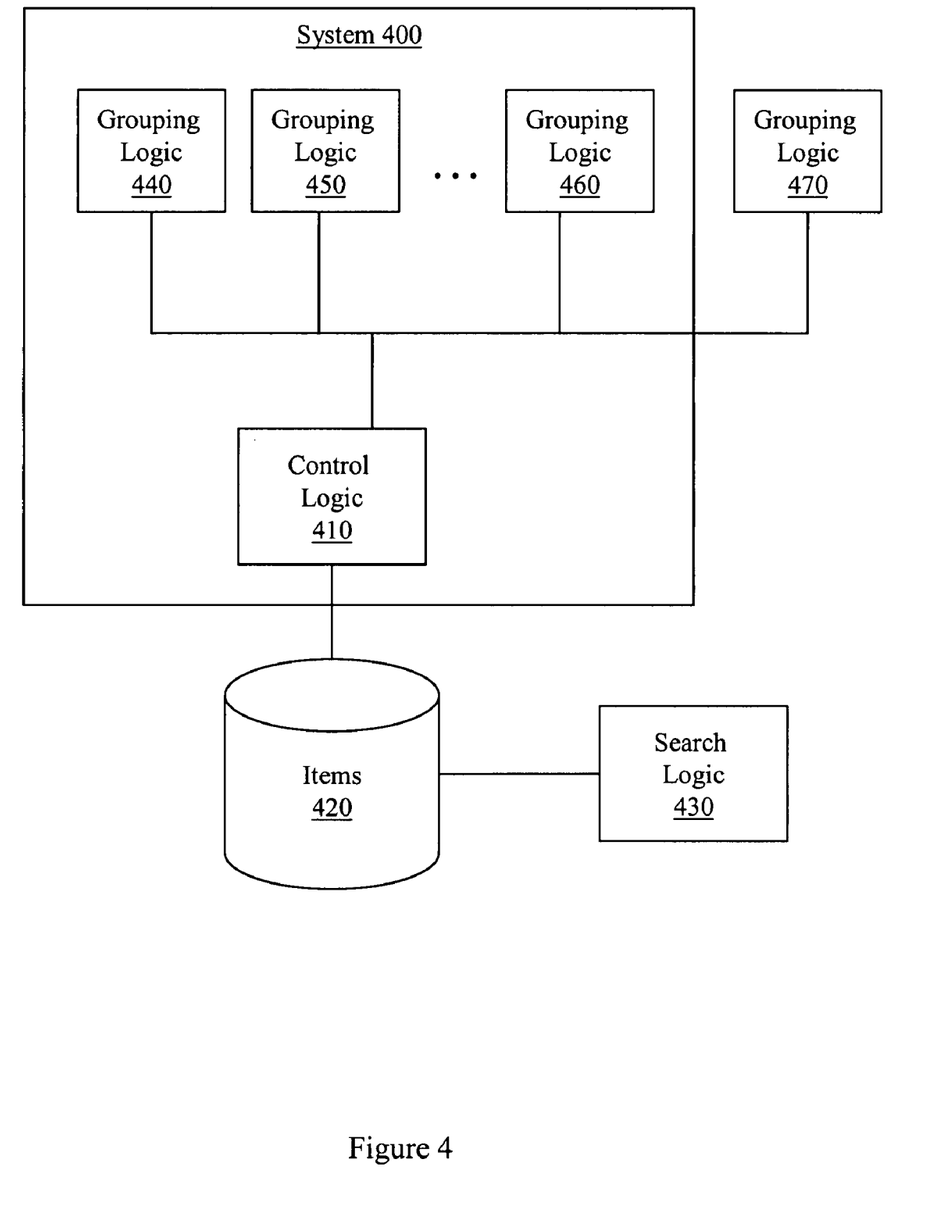
FIG. 4 illustrates an example system associated with grouping search results.

FIG. 4 illustrates a system 400 that selectively groups search results. System 400 may include a control logic 410 that receives a set of items 420 returned by a search logic 430 in response to a search request (e.g., query). The items 420 may include metadata attributes that can be compared to determine whether the items are to be treated as members of a group. Search logic 430 may be an enterprise search engine that searches an enterprise for items relevant to a search request. The search logic 430 may selectively control crawler logics to acquire the set of items. Thus, rather than searching the entire World Wide Web, or the entire Internet, a search may be restricted to items owned by an enterprise. These items may include documents, files, objects, messages, emails, calendar entries, database records, posts to threads in a discussion forum, and so on. In one example, system 400 may include search logic 430.

Control logic 410 may select a subset of items for grouping. In one example, identifying the subset of items includes selecting members of the set of items 420 that have related metadata attributes. In another example, all items returned by the search process may be identified as the subset of items.

Control logic 410 may select a grouping logic to group the subset of items. A grouping logic may be selected based on metadata attributes of the items in the subset. In one example, a grouping method performed by a grouping logic may be pre-defined and included in the system 400. The grouping logic may be application specific. For example, grouping logic 440 may be pre-defined by a provider of an email application to group email items, grouping logic 450 may be pre-defined by a provider of a spreadsheet application to group spreadsheet items, and grouping logic 460 may be pre-defined by a provider of a calendar application to group calendar items. In one example, grouping logics 440, 450, and/or 460 may be included in the system 400.

In another example, a grouping logic may be user-definable and external, or remote, to the system 400. In this example, an item may contain a grouping callback identifier. The grouping callback identifier may be used to invoke a remote grouping logic. For example, a user may define grouping logic 470 to group both email items and spreadsheet items.

Control logic 410 may provide a selected grouping logic with a subset of items. In one example, a pointer to the subset of items is provided to the selected grouping logic. In another example, a copy of the subset of items is provided to the grouping logic. Control logic 410 may control the selected grouping logic to group the subset of items. Controlling the grouping logic may include initiating the execution of a grouping process, handling errors and interruptions during execution, and so on. Control logic 410 may receive a grouped subset of items from the selected grouping control logic. In one example, a pointer to the subset of items may be received. In another example, a copy of the subset of items may be received. Control logic 410 may provide the grouped subset of items to the search logic to be provided to the user in response to user's search request.

Figure 5:
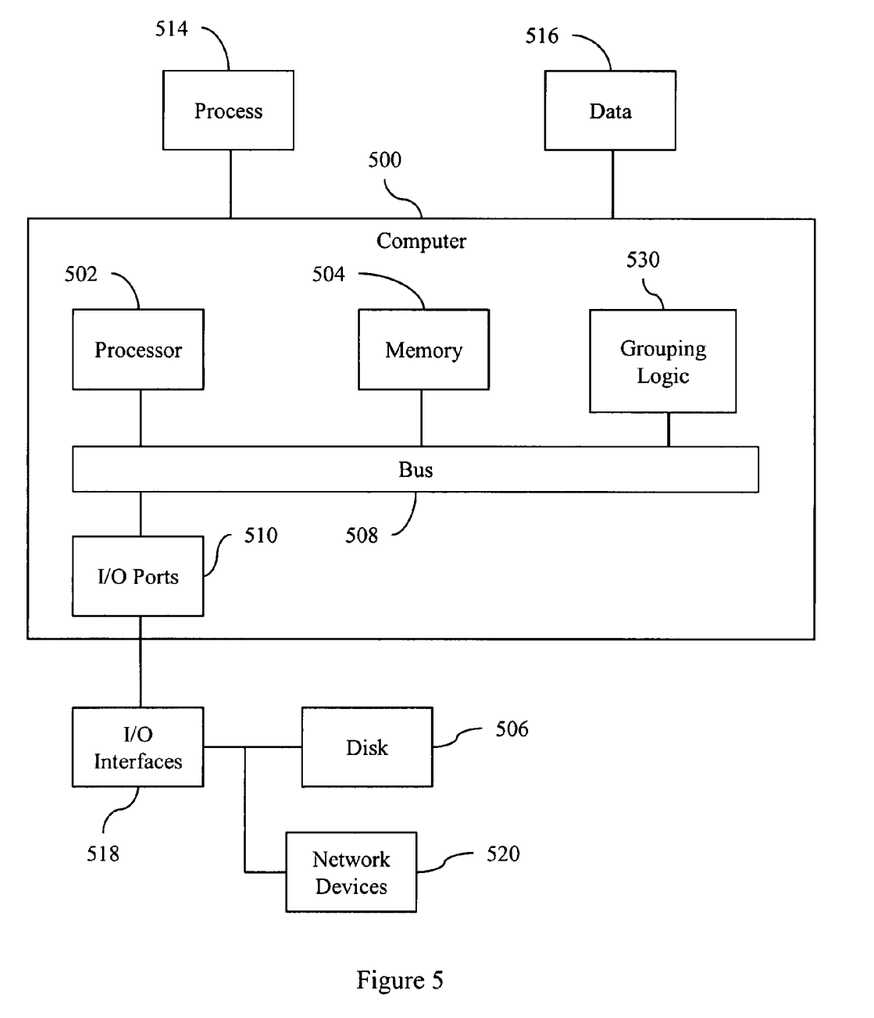
FIG. 5 illustrates an example computing environment in which example systems and methods illustrated herein can operate.

FIG. 5 illustrates an example computing device in which example systems and methods described herein, and equivalents, can operate. The example computing device may be a computer 500 that includes a processor 502, a memory 504, and input/output ports 510 operably connected by a bus 508. In one example, the computer 500 may include a grouping logic 530. Grouping logic 530 may provide means (e.g., memory, data store) for storing a search result. The search result(s) may be provided by a search engine, a crawler(s), and so on. Grouping logic 530 may also provide means (e.g., hardware, software, firmware) for determining whether a metadata attribute associated with the search result indicates that the search result is to be treated as a member of a group. The determination may be based on a comparison of the metadata attribute to other metadata attributes associated with other search results. Grouping logic 530 may also provide means (e.g., hardware, software, firmware) for determining whether a process available through a metadata attribute associated with the search result indicates that the search result is to be treated as a member of a group. Grouping logic 530 may also provide means (e.g., hardware, software, firmware) for selectively grouping a search result that is determined to be a member of a group.

Generally describing an example configuration of the computer 500, the processor 502 can be a variety of various processors including dual microprocessor and other multi-processor architectures. The memory 504 can include volatile memory and/or non-volatile memory. The non-volatile memory can include, but is not limited to, read-only memory (ROM), programmable ROM (PROM), erasable PROM (EPROM), electrically erasable PROM (EEPROM), and so on. Volatile memory can include, for example, random access memory (RAM), synchronous RAM (SRAM), dynamic RAM (DRAM), synchronous DRAM (SDRAM), and so on.

A disk 506 may be operably connected to the computer 500 via, for example, an input/output interface (e.g., card, device) 518 and an input/output port 510. The disk 506 can include, but is not limited to, devices including a magnetic disk drive, a solid state disk drive, a floppy disk drive, a tape drive, a Zip drive, a flash memory card, a memory stick, and so on. Furthermore, the disk 506 can include optical drives including a CD-ROM, a CD recordable drive (CD-R drive), a CD rewriteable drive (CD-RW drive), a digital video ROM drive (DVD ROM), and so on. The memory 504 can store processes 514 and/or data 516, for example. The disk 506 and/or memory 504 can store an operating system that controls and allocates resources of the computer 500.

The bus 508 can be a single internal bus interconnect architecture and/or other bus or mesh architectures. While a single bus is illustrated, it is to be appreciated that computer 500 may communicate with various devices, logics, and peripherals using other busses. The bus 508 can be of a variety of types including, but not limited to, a memory bus or memory controller, a peripheral bus or external bus, a crossbar switch, and/or a local bus. The local bus can be of varieties including, but not limited to, an industrial standard architecture (ISA) bus, a microchannel architecture (MSA) bus, an extended ISA (EISA) bus, a peripheral component interconnect (PCI) bus, a universal serial (USB) bus, a small computer systems interface (SCSI) bus, and so on.

The computer 500 may interact with input/output devices via i/o interfaces 518 and input/output ports 510. Input/output devices can include, but are not limited to, a keyboard, a microphone, a pointing and selection device, cameras, video cards, displays, disk 506, network devices 520, and so on. The input/output ports 510 can include but are not limited to, serial ports, parallel ports, and USB ports.

The computer 500 can operate in a network environment and thus may be connected to network devices 520 via the i/o devices 518, and/or the i/o ports 510. Through the network devices 520, the computer 500 may interact with a network. Through the network, the computer 500 may be logically connected to remote computers. The networks with which the computer 500 may interact include, but are not limited to, a local area network (LAN), a wide area network (WAN), and other networks. The network devices 520 can connect to LAN technologies including, but not limited to, fiber distributed data interface (FDDI), copper distributed data interface (CDDI), Ethernet (IEEE 802.3), token ring (IEEE 802.5), wireless computer communication (IEEE 802.11), Bluetooth (IEEE 802.15.1), and so on. Similarly, the network devices 520 can connect to WAN technologies including, but not limited to, point to point links, circuit switching networks (e.g., integrated services digital networks (ISDN)), packet switching networks, and digital subscriber lines (DSL).

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A non-transitory computer-readable medium storing computer-executable instructions that when executed by a computer cause the computer to perform a method, the method comprising:
   selecting a metadata attribute having a set of values for grouping search results;
   determining values of the selected metadata attribute for a result set of items returned by a search process;
   identifying a first set of related items among the result set of items having a first attribute value for the selected metadata attribute and a second set of related items among the result set of items having a second attribute value for the selected metadata attribute; and
   displaying the result set of items in a first group comprising the first set of related items and a second group comprising the second set of related items.

2. The non-transitory computer-readable medium of claim 1, the result set of items including one or more of, an email, a calendar entry, a document, a file, a record, and an object.

3. The non-transitory computer-readable medium of claim 2, where a value for the selected metadata attribute indicates the record being one of, a purchase order, a client relationship management record, a sales receipt, and a message, and the object being one of, a productivity object, and a business object.

4. The non-transitory computer-readable medium of claim 1, the search process being performed by an enterprise search engine.

5. The non-transitory computer-readable medium of claim 4, comprising selecting two or more metadata attributes and comparing values of the two or more metadata attributes to identify related items.

6. The non-transitory computer-readable medium of claim 1, a value of the selected metadata attribute being static and being determined at the time of a crawl.

7. The non-transitory computer-readable medium of claim 1, a value of the selected metadata attribute being static and being created and assigned to an item by an application associated with the item.

8. The non-transitory computer-readable medium of claim 1, a value of the selected metadata attribute being dynamic and being determined after the set of items are identified by the search process.

9. A method, comprising:
receiving a first item in response to an automated search, the first item including a first value for a selected metadata attribute;
receiving a second item in response to the automated search, the second item including the first value for the selected metadata attribute;
receiving a third item in response to the automated search, the third item including a second value for the selected metadata attribute;
comparing the first value and the second value;
selectively grouping the first item and the second item in a first group upon identifying the first value;
selectively grouping the third item in a second group upon identifying the second value; and
displaying the first item and the second item in the first group and the third item in the second group as the grouped result.

10. The method of claim 9, where the selected metadata attribute is document type, and where a value of the selected metadata attribute indicates an item being one of, a document, a file, an object, an email, and a calendar entry.

11. The method of claim 9, the search being performed by an enterprise search engine that selectively controls a crawler to perform the search.

12. The method of claim 11, the first value and the second value being static and being determined at the time of a crawl.

13. The method of claim 9, the first value and the second value being dynamic and being determined at the time the first item, the second item, and the third item are received in response to the search.

14. A non-transitory computer-readable medium storing computer-executable instructions that when executed by a computer cause the computer to perform a method, the method, comprising:
identifying items received in response to an automated search that have matching callback identifiers that call a comparison procedure to compare values of a selected metadata attribute of the items, and to group items having a first value of the selected metadata attribute in a first group and items having a second value of the selected metadata attribute in a second group;
providing the identified items to the comparison procedure;
selectively storing the items as grouped by the comparison procedure in the first group and the second group in a computer memory; and
displaying the items received in response to the automated search in the first group and the second group as a grouped result.

15. The non-transitory computer-readable medium of claim 14, where a value of the values for the selected metadata attribute indicate that an item is one of, a document, a file, an object, an email, and a calendar entry.

16. The non-transitory computer-readable medium of claim 14, the process available through the grouping callback identifier being a user-definable process.

17. The non-transitory computer-readable medium of claim 16, the process available through the grouping callback identifier being a remote process.

18. A system, comprising:
a processor;
a memory;
one or more grouping logics to group a subset of items; and
a control logic configured to:
identify items returned by a search logic in response to a search of an enterprise, where the items are identified for grouping based, at least in part, on values of a metadata attribute;
select a grouping logic from the one or more grouping logics based, at least in part, on comparing the values of the metadata attribute;
provide the items to the selected grouping logic;
control the selected grouping logic to group a first set of the items having a first value of the metadata attribute and a second set of the items having a second value of the metadata attribute into a first group and a third set of the items having a third value of the metadata attribute into a second group;
receive the items into the first group and the second group from the selected grouping logic; and
provide the items identified in the first group and the second group to the search logic, where the search logic is configured to display the items in the first group and the second group.

19. The system of claim 18, the search logic being an enterprise search engine that selectively controls one or more crawler logics to acquire the items.

20. The system of claim 19, the system including the search logic.

21. The system of claim 18, where the selected grouping logic is to group the items using a user-definable process.

22. The system of claim 21, where the metadata attribute is a callback identifier.

* * * * *

UNITED STATES PATENT AND TRADEMARK OFFICE
CERTIFICATE OF CORRECTION

Page 1 of 1

PATENT NO. : 8,271,493 B2
APPLICATION NO. : 11/974085
DATED : September 18, 2012
INVENTOR(S) : Chang et al.

It is certified that error appears in the above-identified patent and that said Letters Patent is hereby corrected as shown below:

In the specification,

In column 3, line 29, delete "a servelet," and insert -- a servlet, --, therefor.

In the claims,

In column 12, lines 45-46, delete "21. The system of claim 18, where the selected grouping logic is to group the items using a user-definable process.".

In column 12, lines 47-48, delete "22. The system of claim 21, where the metadata attribute is a callback identifier.".

Signed and Sealed this
Thirteenth Day of October, 2015

Michelle K. Lee
*Director of the United States Patent and Trademark Office*